(12) United States Patent
Bilbrey et al.

(10) Patent No.: US 7,438,313 B2
(45) Date of Patent: Oct. 21, 2008

(54) COMPACT MULTI-LEVEL OUTPUT GAS GENERATOR

(75) Inventors: David Anthony Bilbrey, Knoxville, TN (US); Scott Joseph Colburn, Oak Ridge, TN (US); C. Richard Husband, Knoxville, TN (US); Robert William Rovito, Knoxville, TN (US); Samuel Morgan Hancock, Knoxville, TN (US)

(73) Assignee: ARC Automotive, Inc., Knoxville, TN ( * ) Notice: Subject to any disclaimer, the term of this patent is extended or adjusted under 35 U.S.C. 154(b) by 455 days.

(21) Appl. No.: 11/054,338

(22) Filed: Feb. 10, 2005

(65) Prior Publication Data

US 2005/0161922 A1 Jul. 28, 2005

Related U.S. Application Data

(63) Continuation-in-part of application No. 10/634,797, filed on Aug. 6, 2003, now abandoned.

(51) Int. Cl.
*B60R 21/26* (2006.01)
(52) U.S. Cl. ...................................... 280/737
(58) Field of Classification Search ................ 280/737, 280/736, 740, 741, 742
See application file for complete search history.

(56) References Cited

U.S. PATENT DOCUMENTS

| 3,905,515 A | 9/1975 | Allemann |
|---|---|---|
| 5,219,178 A | 6/1993 | Kobari et al. |
| 5,221,109 A | 6/1993 | Marchant |
| 5,564,743 A | 10/1996 | Marchant |
| 5,582,428 A | 12/1996 | Buchanan et al. |
| 5,630,619 A | 5/1997 | Buchanan et al. |
| 5,683,107 A | 11/1997 | Headley et al. |
| 5,719,351 A | 2/1998 | Johnson et al. |
| 5,794,973 A | 8/1998 | O'loughlin et al. |
| 5,799,973 A | 9/1998 | Bauer et al. |
| 5,851,030 A | 12/1998 | Johnson et al. |
| 5,934,705 A | 8/1999 | Siddiqui et al. |

(Continued)

*Primary Examiner*—Faye M. Fleming
(74) *Attorney, Agent, or Firm*—Nixon & Vanderhye, PC

(57) ABSTRACT

A multi-level gas inflator for an air bag or other safety device, comprising an elongated pressure vessel having a primary gas generant portion with a first open end and a secondary portion with a second open end. The primary gas generant portion has a primary ignition device and primary gas generating energetics disposed therein. The primary ignition device is mounted on and closes the pressure vessel at the first open end thereof. The secondary portion may have a secondary ignition device and secondary gas generating energetics disposed therein. The secondary ignition device may be mounted on the pressure vessel at the second open end thereof. A suitable gas under a predetermined pressure is present in the primary and secondary portions. One or more separate dividers or divider walls are disposed within the midportion of the pressure vessel to separate the primary and secondary portions. The pressure vessel may have a primary exit orifice in the midportion thereof that is in communication with the primary gas generant portion, and a secondary exit orifice in the midportion thereof that is in communication with the secondary portion. A primary rupture disk is disposed over the primary exit orifice, and a secondary rupture disk is disposed over the secondary exit orifice. A diffuser may be mounted on and surround the pressure vessel midportion and the primary and secondary exit orifices. Each divider or divider wall may have a communication port therethrough.

54 Claims, 13 Drawing Sheets

U.S. PATENT DOCUMENTS

| | | |
|---|---|---|
| 5,970,880 A | 10/1999 | Perotto |
| 6,089,598 A | 7/2000 | Snyder et al. |
| 6,095,559 A | 8/2000 | Smith et al. |
| 6,095,561 A | 8/2000 | Siddiqui et al. |
| 6,149,193 A | 11/2000 | Canterberry et al. |
| 6,168,200 B1 | 1/2001 | Greist, III et al. |
| 6,213,503 B1 | 4/2001 | Zimbrich et al. |
| 6,237,498 B1 | 5/2001 | Winterhalder et al. |
| 6,253,683 B1 | 7/2001 | Fukabori |
| 6,314,888 B1 | 11/2001 | Muller et al. |
| 6,460,883 B1 | 10/2002 | Nakashima et al. |
| 6,464,254 B2 | 10/2002 | Chikaraishi et al. |
| 6,485,051 B1 | 11/2002 | Taguchi et al. |
| 6,547,277 B1 | 4/2003 | Adamini et al. |
| 6,793,244 B1 | 9/2004 | Katsuda et al. |
| 6,808,204 B1 | 10/2004 | Katsuda et al. |
| 2002/0000716 A1 | 1/2002 | Chikaraishi et al. |
| 2003/0047923 A1 | 3/2003 | Ogawa et al. |
| 2003/0057689 A1 | 3/2003 | Katsuda et al. |
| 2004/0155444 A1 | 8/2004 | Matsuda et al. |
| 2004/0207188 A1 | 10/2004 | Matsuda et al. |

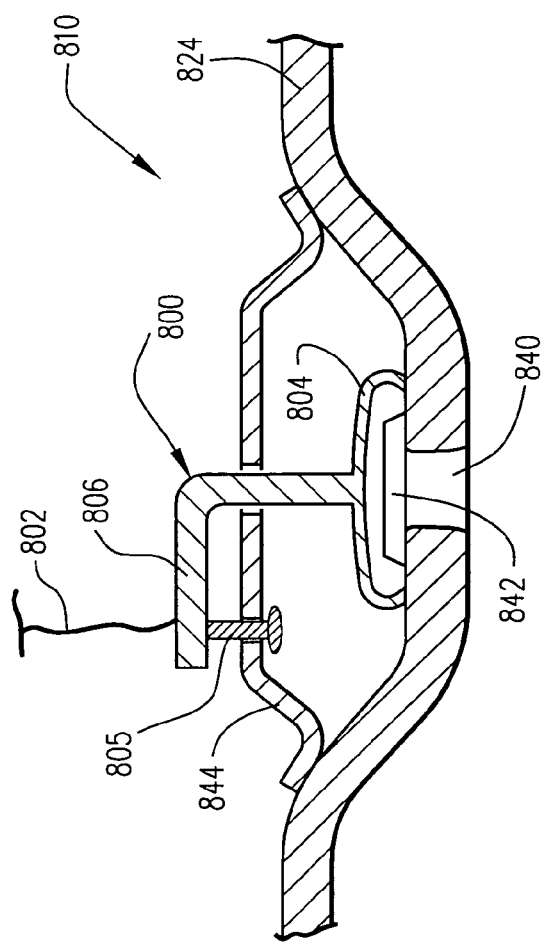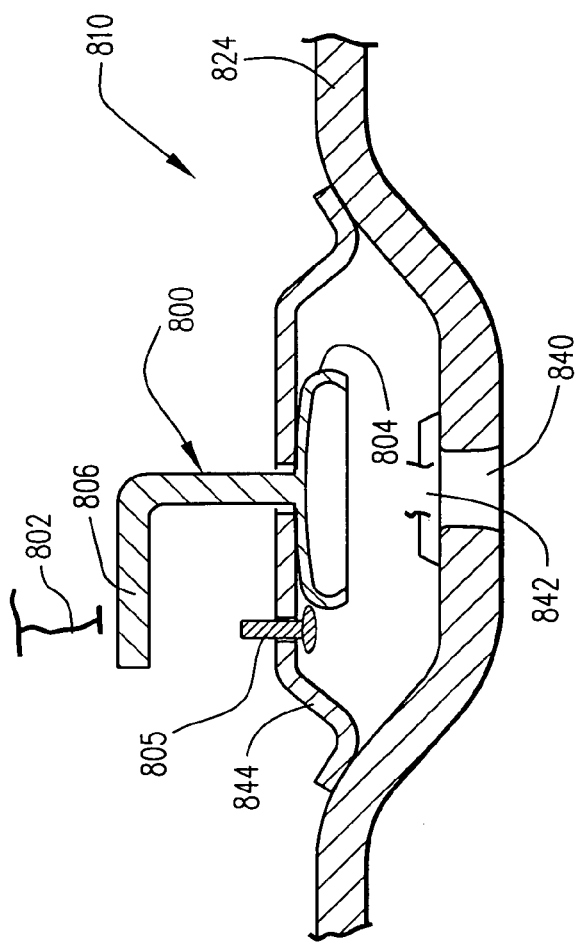

COMPACT MULTI-LEVEL OUTPUT GAS GENERATOR

CROSS REFERENCE TO RELATED APPLICATIONS

The present application is a continuation-in-part of application Ser. No. 10/634,797, filed on Aug. 6, 2003 now abandoned.

BACKGROUND OF THE INVENTION

1. Field of the Invention

The present invention relates generally to an inflator or gas generator for an air bag or other safety device and, more specifically, to a compact multi-level output inflator or gas generator which can selectively release gas at different rates and levels and thus enable the air bag or another type of safety device to be deployed or operated at different output levels in accordance with different sensor inputs.

2. Description of the Related Art

Recently, there has been a demand for controlling the rate and amount of inflation or operation of safety devices such as air bag restraint systems in accordance with variables such as passenger size, position, seat belt usage and the velocity of a vehicle at the time of collision.

In order to provide optimal occupant protection, different levels of output are required from the airbag inflator. For example, in a high-speed collision with a large unbelted person, full rapid inflation of the air bag is required to provide the best restraint. In lower speed crashes with smaller sized occupants or even out-of-position occupants, a lower, slower rate of inflation is required so as not to inadvertently injure the occupant but still provide enough inflation to effect appropriate restraint.

In currently available air bag inflators intended for multi-level or variable output function, the performance is accomplished primarily with inflators which are made up of two individual inflators of the same type that may share one manifold, or by individual propellant chambers in a common pressure vessel sharing one common manifold.

Utilizing two separate inflators of the hybrid type, for example, results in large, heavy and expensive designs since nearly every component is duplicated. For example, there are two distinct pressure vessels, with redundant closures, seals, and in some cases diffusers or manifolds. Additionally, there is the added requirement of securing the two inflators to a common platform, which in turn increases cost, weight, and complexity in manufacturing.

The second approach of having separate propellant chambers encapsulated in one common pressure vessel results in more efficient packaging and reduced cost if the components are shared by the two propellant charges. To achieve different levels of inflation, it has been proposed in U.S. Pat. No. 3,773,353 to Trowbridge et al. to provide two separate charges and to ignite one in the event that a slow inflation is required and to ignite both in the event of a high speed collision, thus achieving the very rapid inflation and deployment of the air bag which is necessary under such circumstances. In this device the charges are arranged within a housing which is filled with a non-toxic gas under pressure. This housing is sealed by a burst plate that is punched out by a piston and rod type of arrangement when a first of the two charges is detonated. This arrangement suffers from the drawback of being relatively complex and therefore, relatively expensive. For example, no less than three burst plate arrangements are necessary. Also, the charges are each isolated from the reservoir and reservoir gas by an inner housing and a respective rupturable closure.

U.S. Pat. No. 3,905,515 to Allemann discloses another multi-stage inflator assembly which utilizes two separate charges and which disposes the charges in a chamber which is used to store a non-noxious gas under pressure. However, this arrangement is even more complex than that in U.S. Pat. No. 3,773,353. In this arrangement a portion of the burst disc forms the head of a slidable shuttle valve member which is projectable into an exhaust passage to partially throttle the outflow of gases following a detonation of one or both of the two charges.

Consequently, there is a need for a cost-effective, lightweight, compact, simple multi-level output inflator or gas generator for air bags and the like. This need is met by the new and improved multi-level output hybrid inflator and gas generator of the present invention.

SUMMARY OF THE INVENTION

It is an object of the present invention, therefore, to overcome the disadvantages of the prior art and to provide a cost-effective, lightweight, compact and simple multi-level output hybrid inflator or gas generator which is reliable in operation.

A further object of the present invention is to provide a multi-level output hybrid inflator or the like with two gas generators, which permits ignition of the gas generators either separately, simultaneously or in a timed sequence to effect air bag inflation or operation of a safety device at different rates in accordance with sensor inputs resulting from a crash or the like.

It is a further object of the present invention to provide a multi-level output inflator or gas generator which utilizes a common pressure vessel for a primary hybrid type gas generator and a secondary hybrid type gas generator.

A still further object of the present invention is to provide such a multi-level output inflator or gas generator which may be easily converted to a single level inflator or gas generator in a cost effective manner.

Another object of the present invention is to provide such a multi-level output inflator or gas generator with one or more simple and effective, separate non-hermetic dividers or divider walls in the center portion thereof that separate the primary and secondary gas generators.

An additional object of the present invention is to provide such a multi-level output inflator or gas generator with exit orifices and a diffuser located in the center portion thereof to enable it to remain substantially thrust-neutral during deployment.

A further object of the present invention is to provide such a multi-level inflator or gas generator with a standpipe connected to the diffuser in the center portion thereof that, in one embodiment, protrudes outwardly in one direction with radial or lateral flow orifices for improved gas distribution and serving to direct flow away from the occupant.

A still further object of the present invention is to provide such a multi-level inflator or gas generator with dividers in the center portion thereof that separate the primary and secondary gas generators.

Still another object of the present invention is to provide such a multi-level output inflator or gas generator which is simple in construction and easy to assemble to minimize the cost and size of the assembly.

These and other objects of the present invention are achieved by providing a multi-level output inflator or gas generator for inflating a vehicle safety restraint such as an air bag, comprising a common pressure vessel for a primary gas generator and a secondary gas generator that are separated from each other by one or more simple non-hermetic dividers or divider walls in the center portion thereof. In one embodiment, the divider or divider wall is a separate member. In another embodiment, the dividers are provided by adjacent end walls of the gas generant canisters or cups located in the center portion of the inflator. The gases from the primary and secondary gas generators are directed to a common diffuser in the center portion thereof for inflation of the air bag. The combination of a primary hybrid gas generator and a secondary hybrid gas generator in a simple common pressure vessel in a single multi-level output inflator minimizes size and cost. Also, simple assembly methods, such as magnetic forming, swaging, crimping and welding may be used to assemble the present multi-level output inflator or gas generator because of its simple construction.

BRIEF DESCRIPTION OF THE DRAWINGS

FIG. 10 is a side elevational view of a portion of a multi-level inflator in accordance with the present invention showing a release device movably mounted adjacent to the secondary exit orifice and rupture disk, and being connected to a tether for limiting the expansion of the air bag;

FIG. 11 is a side elevational view similar to FIG. 10 in which the release device has been moved outwardly by the flow of gas through the secondary exit orifice to release the tether and allow additional expansion of the air bag;

DESCRIPTION OF THE PREFERRED EMBODIMENTS

Figure 1:
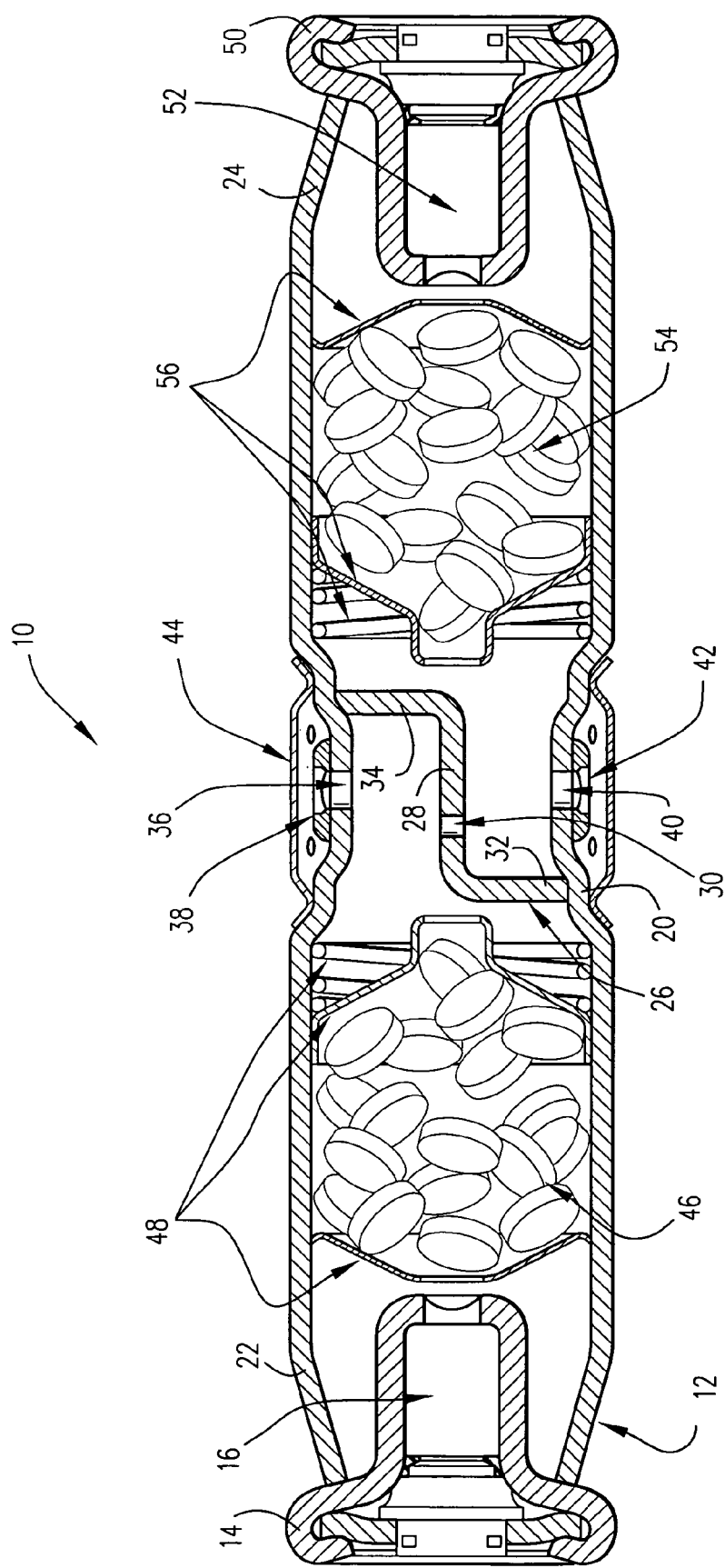
FIG. 1 is a side elevational view in section of a first embodiment of the multi-level output inflator of the present invention.

FIG. 1 illustrates a first embodiment of the multi-level output inflator or gas generator 10 of the present invention. The inflator 10 comprises an elongated pressure vessel 12 formed of any suitable material, such as steel, aluminum or the like. An igniter body 14 formed of any suitable material, such as steel, aluminum or the like, and supporting a primary ignition device 16 of any suitable construction is secured to a first end of the pressure vessel 12 in any suitable manner, such as by crimping or a friction weld. The primary ignition device 16, e.g., may be an initiator or a microgas generator.

The pressure vessel 12 may be formed with an indented portion 20 of any suitable configuration near the middle thereof. The middle or indented portion 20 serves to define a primary gas generant portion 22 of the pressure vessel between the middle or indented portion and the primary ignition device 16, and a secondary gas generant portion 24 between the middle or indented portion and the second or opposite end of the pressure vessel 12.

A separate divider or divider wall 26 formed of any suitable material such as steel or aluminum is positioned adjacent to or secured at its ends in any suitable manner to opposite sides of the indented portion 20 of the pressure vessel 12 to separate it into the primary and secondary gas generant portions 22 and 24, respectively. The divider 26 comprises a central, substantially longitudinally extending portion 28 which may have one or more communication ports 30 of any suitable size therethrough, a first substantially transverse end portion 32 disposed adjacent to or secured to the indented portion 20 on one side thereof near the primary gas generant portion 22, and a second substantially transverse end portion 34 disposed adjacent to or secured to the indented portion 20 on the other side thereof near the secondary gas generant portion 24. It is noted that the divider 26 is simple in construction and need not be hermetically connected or sealed to the pressure vessel 12. Also, the shape of the divider 26 may be somewhat different so long as it accomplishes the purpose described herein. Within the scope of the present invention, the divider 26 may be formed without any communication ports 30 therethrough.

In accordance with one embodiment of the invention, the communication port 30 preferably is oriented such that the gas flow therethrough is in the radial direction, as shown in FIG. 1. The purpose of the communication port 30 is to generate a pressure difference between the primary and secondary gas generant portions 22 and 24 when one portion is activated before the other such that sympathetic ignition is prevented and there is a delay in the functioning of the rupture disk in the subsequently activated other portion, as will be apparent from the description hereinafter.

The middle or indented portion 20 of the pressure vessel 12 has a primary exit orifice 36 of any suitable size on one side thereof that is covered by a primary rupture disk 38 of any suitable construction, and a secondary exit orifice 40 of any suitable size on the other side thereof that is covered by a secondary rupture disk 42 of any suitable construction. A generally cylindrical diffuser 44 of any suitable construction may be provided to surround the indented portion 20 and the primary and secondary exit orifices 36 and 40, respectively, and is secured to the pressure vessel in any suitable manner, such as by welding. The diffuser 44 is adapted for communication with an air bag module or other safety device (not shown), and may be constructed to create a back pressure on the rupture disk 38 or 42 in the gas generant portion that is not activated first to cause a delay in the functioning of the rupture disk or to prevent the functioning thereof in the case where only one gas generant portion is activated.

Within the primary gas generant portion 22 of the pressure vessel there are mounted primary gas generating energetics 46 of any suitable type, such as pellets formed of any suitable gas generating composition, that may be surrounded by any suitable type of retention and anti-rattle devices 48. Also, the primary energetics 48 may be in the form of a solid grain or the like.

An igniter body 50 formed of any suitable material and supporting a secondary ignition device 52 of any suitable construction is secured to the second or opposite end of the pressure vessel 12 in any suitable manner, such as by crimping or a friction weld. Within the secondary gas generant portion 24 of the pressure vessel 12 there are mounted secondary gas generating energetics 54 of any suitable type, such as pellets formed of any suitable gas generating composition, that may be surrounded by any suitable type of retention and anti-rattle devices 56. The secondary energetics 54 may be in the form of a solid grain or the like, and may be the same as or different in type and amount from the primary energetics 46.

The primary gas generant portion 22 and secondary gas generant portion 24 of the pressure vessel 12 are filled with a suitable gas, e.g., air, nitrogen or an inert gas such as argon or helium, or a mixture thereof, that is under a suitable predetermined pressure, depending on whether the inflator is a hybrid or all pyrotechnic type.

In one operation of the inflator or gas generator 10, upon the sensing of a vehicle crash or the like, the primary ignition device 16 will be fired to ignite the primary energetics 46 to generate primary combustion gas that increases the pressure of the gas in the primary gas generant portion 22 at a rate faster than that in the secondary portion 24 via the communication port or ports 30 or through leakage to cause the primary rupture disk 38 to fail and allow the pressurized gas to exit through the primary exit orifice 36 into the diffuser 44. Thereafter, the secondary rupture disk 42 may be constructed to rupture when exposed to increased pressure resulting from gas flow through the communication port or ports 30 into the secondary gas generant portion 24. The diffuser 44, being centrally located, directs the gas in a substantially thrust-neutral, radial pattern into the air bag module (not shown) to inflate the air bag.

Depending on the nature of the vehicle crash and other variables such as passenger size and position, the secondary energetics 54 may be ignited alone, simultaneously with or in a timed sequence before or after the ignition of the primary energetics 46 to establish different rates and levels of inflation of the air bag. The operation of the secondary gas generator is the same as that hereinbefore described with respect to the primary gas generator. The increased pressure in the secondary gas generant portion 24 caused by the ignition of the primary and/or secondary energetics results in the failure of the secondary rupture disk 42 to allow the pressurized gas to exit through the secondary exit orifice 40 into the diffuser 44.

In one embodiment, when one or more communication ports 30 are provided in the divider 26, the primary and secondary rupture disks 38 and 42 may be of the same construction so that they rupture at the same pressure. When the primary energetics 46 are ignited, therefore, the pressure will build up faster on the primary rupture disk 38 and it will rupture before the rupture of the secondary rupture disk 42 caused by gas flow through the communication port or ports 30 and increased pressure in the secondary gas generant portion 24. This embodiment is advantageous in that the same rupture disk can be used for the primary and secondary exit orifices 36 and 40.

Figure 2:
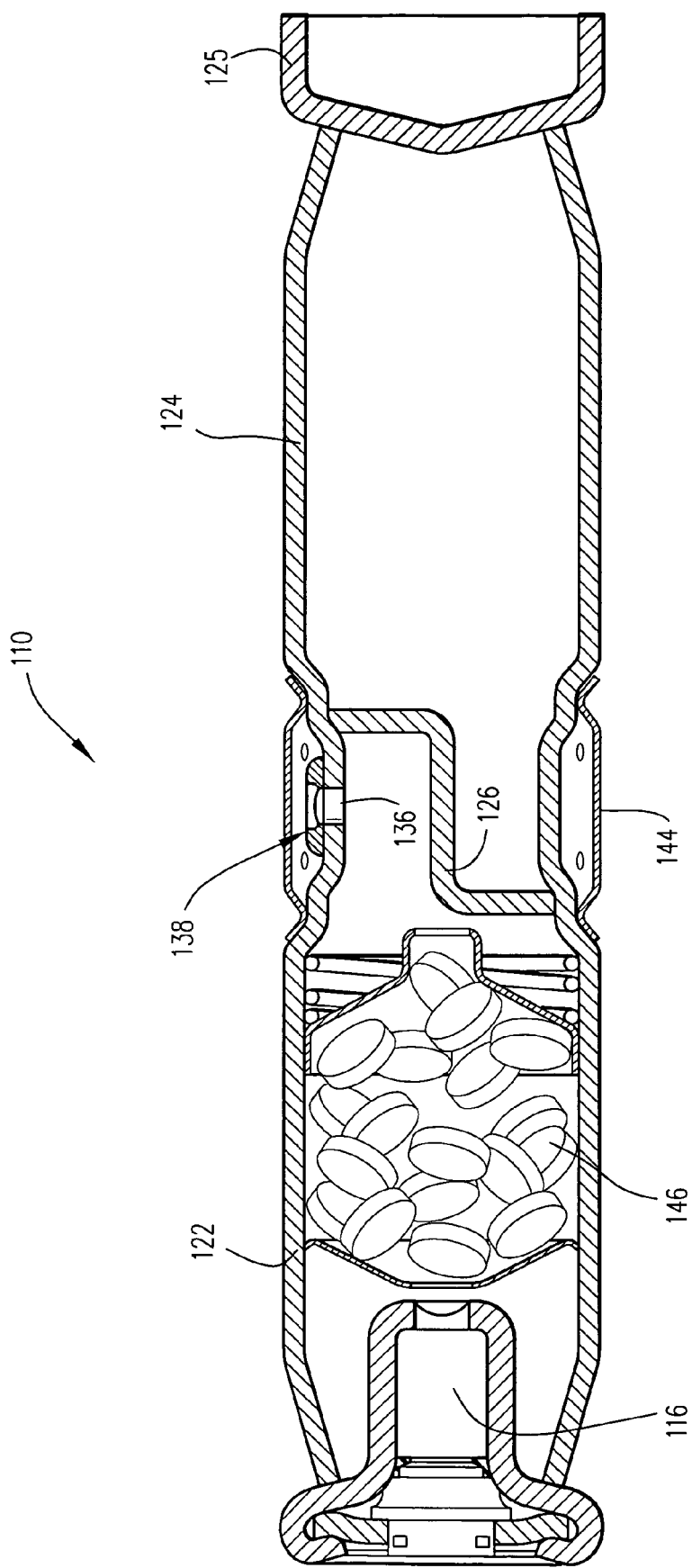
FIG. 2 is a side elevational view in section of a second embodiment of the multi-level output inflator of the present invention constructed for single level operation.

FIG. 2 is directed to a second embodiment of the inflator of the present invention which illustrates the simple manner in which the multi-level inflator of FIG. 1 can be converted into a single level inflator 110 wherein there are no energetics in the secondary portion 124 of the pressure vessel 112. The end of the secondary portion 124 is closed by a closure member 125 of any suitable construction that is secured thereto in any suitable manner. The primary gas generant portion 122 of the pressure vessel 112 includes a primary ignition device 116, primary energetics 146, a primary exit orifice 136, a primary rupture disk 138, a diffuser 144 and a divider 126 which are constructed and operate in substantially the same manner as those shown in FIG. 1. In an alternate construction, when a communication port is provided in the divider 126, a secondary exit orifice and rupture disk like those shown in FIG. 1 may be provided in the secondary portion 124.

Figure 3:
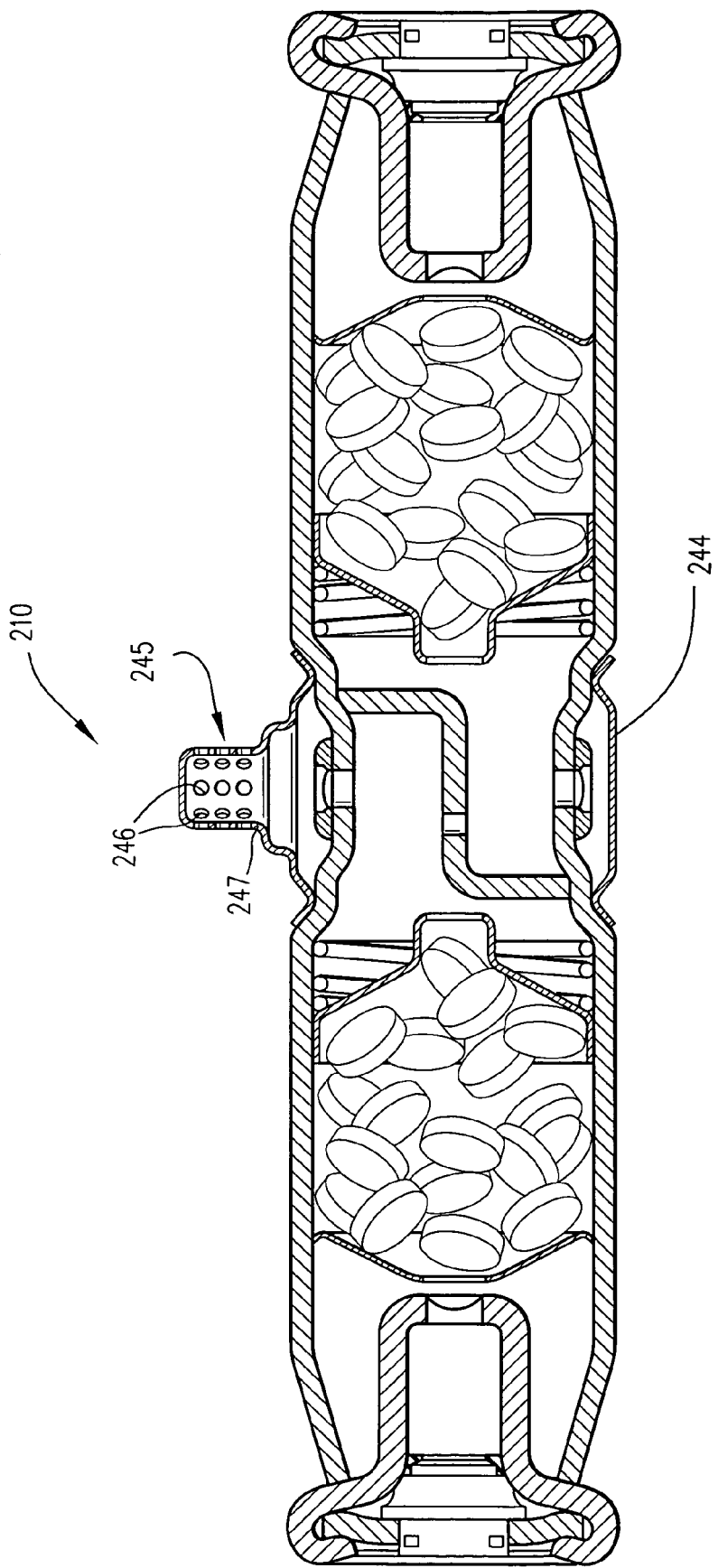
FIG. 3 is a side elevational view in section of a modified embodiment of the inflator shown in FIG. 1.

FIG. 3 illustrates a multi-level output inflator 210 that is substantially the same in construction and operation to the inflator 10 shown in FIG. 1, with the exception that the diffuser 244 is provided with a standpipe 245 for interface with the air bag module (not shown). The standpipe 245 is provided with a plurality of orifices 246 in the sidewall 247 thereof for the purpose of directing the flow of the pressurized gas laterally or radially outwardly therefrom in a direction away from the occupant of the vehicle in which the air bag (not shown) is mounted. Preferably, the orifices 246 are uniformly spaced in the sidewall 247 to provide for uniform flow outwardly therefrom and improved gas distribution. Alternatively, the orifices may be provided in any suitable pattern in the sidewall for axial or other flow therefrom.

Figure 4:
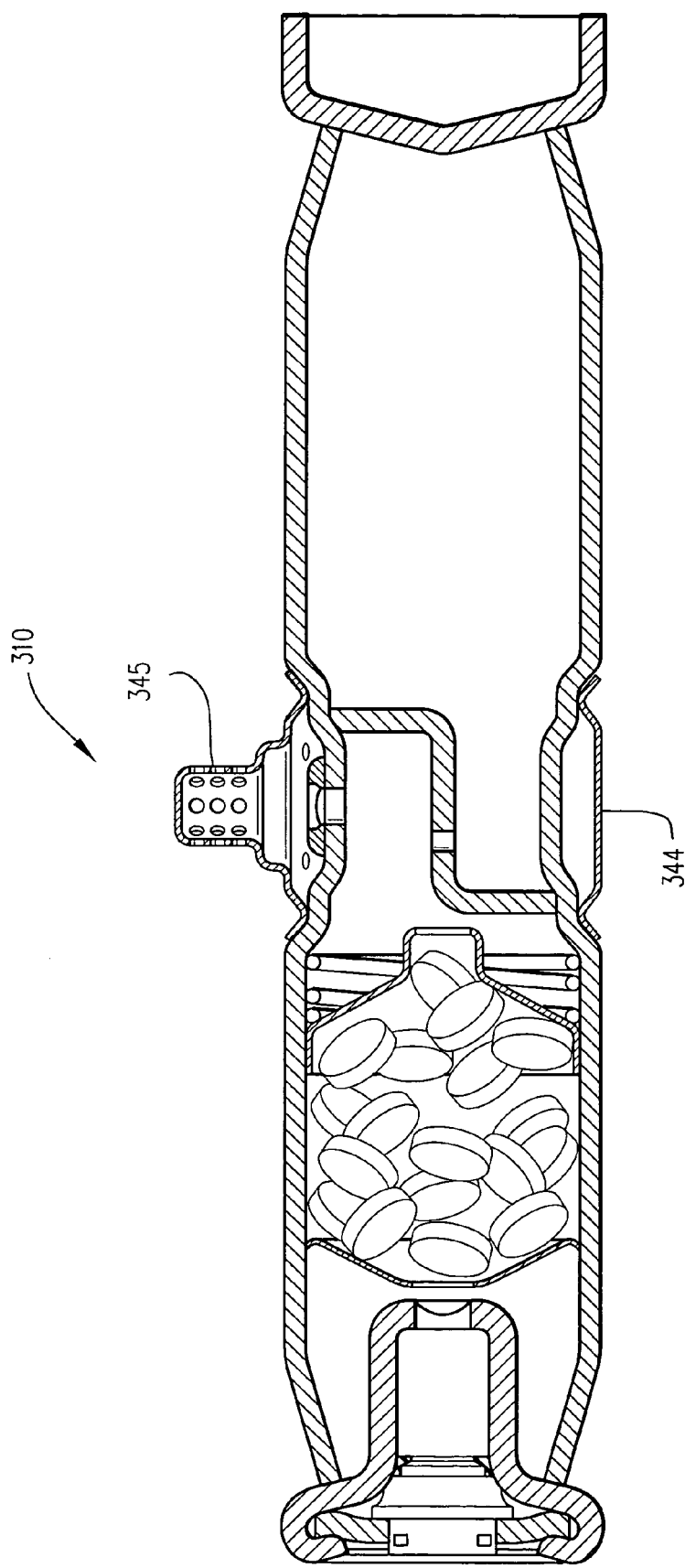
FIG. 4 is a side elevational view in section of a modified embodiment of the multi-level output inflator shown in FIG. 2.

FIG. 4 illustrates a single level inflator 310 that is substantially the same in construction and operation to the inflator 110 shown in FIG. 2, with the exception that the diffuser 344 is provided with a standpipe 345 like the standpipe 245 shown in FIG. 3 for interface with the air bag module or other safety device (not shown).

Figure 5:
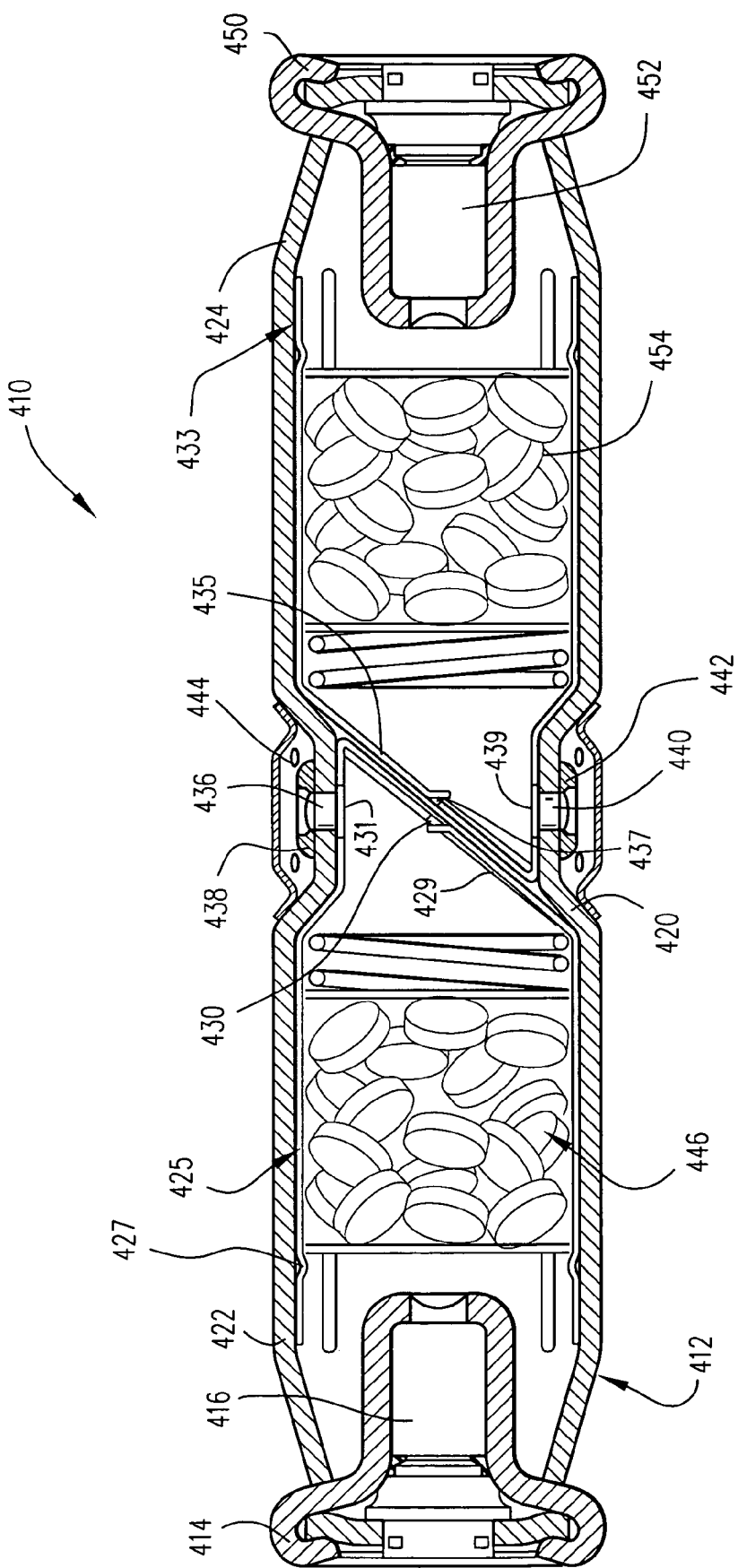
FIG. 5 is a side elevational view in section of a third embodiment of the multi-level output inflator of the present invention.

FIG. 5 illustrates a third embodiment of the multi-level output inflator 410 of the present invention. The inflator 410 comprises an elongated pressure vessel 412 formed of any suitable material. An igniter body 414 formed of any suitable material and supporting a primary ignition device 416 of any suitable construction is secured to a first end of the pressure vessel 412 in any suitable manner such as by crimping. The primary ignition device 416 may be an initiator or a microgas generator.

The pressure vessel 412 may be formed with an indented portion 420 of any suitable configuration near the middle thereof. The middle or indented portion 420 serves to define a primary gas generant portion 422 of the pressure vessel between the indented portion 420 and the primary ignition device 416, and a secondary gas generant portion 424 between the indented portion 420 and the second or opposite end of the pressure vessel 412.

A primary gas generant canister 425 formed of any suitable material such as alloy steel is mounted within the primary gas generant portion 422 of the pressure vessel and conforms generally to the interior shape of the pressure vessel and the adjacent indented portion 420 thereof. Primary gas generating energetics 446 of any suitable type are mounted within the canister 425 and are retained in position therein by an indentation 427 or the like formed in the outer end of the canister. The inner end of the primary canister 425 is closed by an angled divider wall 429 that extends from one side of the indented portion 420 of the pressure vessel 412 to the other side thereof to separate it into the primary and secondary gas generant portions 422 and 424, respectively. As shown in FIG. 5, the divider wall 429 may have one or more communication ports 430 of any suitable size formed therethrough in any suitable manner such as by stamping. Also, the primary canister 425 has an orifice 431 through the portion of the outer wall thereof that is adjacent to the center of the indented portion 420 of the pressure vessel 412.

Figure 9:
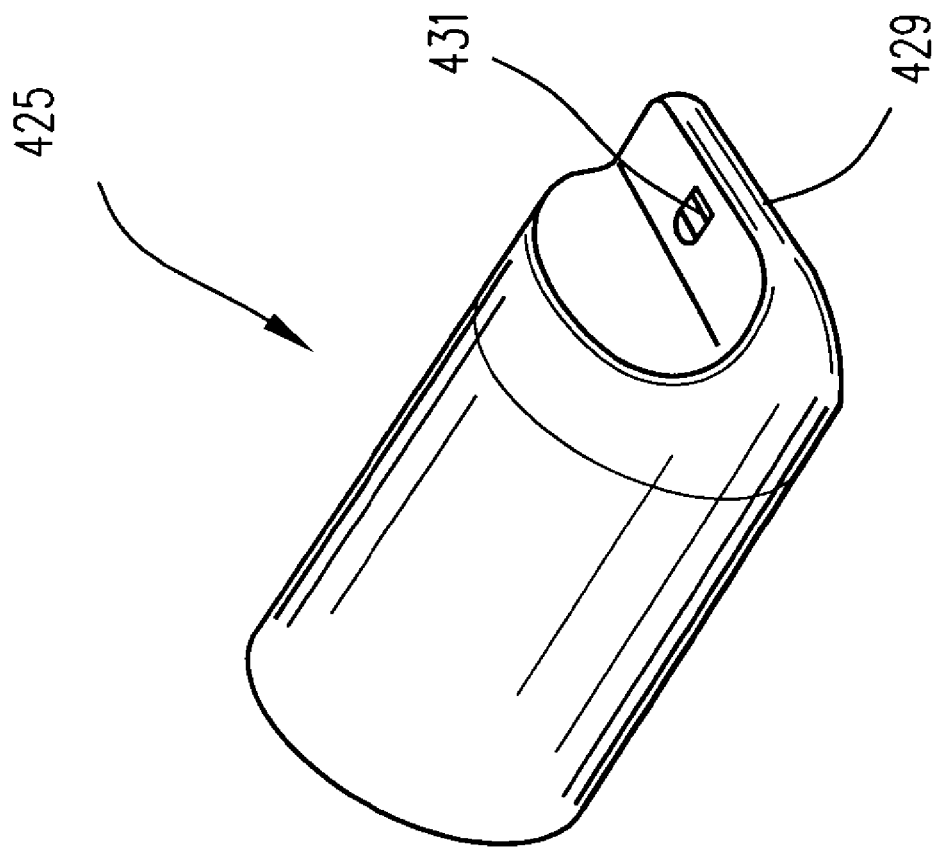
FIG. 9 is a perspective view of one embodiment of a gas generant canister for the multi-level output inflator of the present invention.

FIG. 9 illustrates the canister 425 before insertion into the pressure vessel 412. In this embodiment the canister 425 includes the orifice 431 in the outer wall thereof and the divider wall 429 does not include a communication port therethrough. Within the scope of the present invention, the divider wall 429 may be formed with or without a communication port or ports therethrough.

The indented portion 420 of the pressure vessel 412 has a primary exit orifice 436 on one side thereof that is covered by a primary rupture disk 438 of any suitable construction. The primary exit orifice 436 is located adjacent to the orifice 431 in the outer wall of the primary canister 425. The indented portion 420 also comprises a secondary exit orifice 440 on the other side thereof that is covered by a secondary rupture disk 442 of any suitable construction. A generally cylindrical diffuser 444 of any suitable construction may be provided to surround the indented portion 420 and the primary and secondary exit orifices 436 and 440, respectively, and is secured to the pressure vessel 412 in any suitable manner, such as by welding. The diffuser 444 is adapted for communication with an air bag module or other safety device (not shown), and may be constructed to generate a back pressure as hereinbefore described.

A secondary gas generant canister 433 like the primary gas generant canister 425 is mounted within the secondary gas generant portion 424 of the pressure vessel 412 in inverted relation to the primary canister 425 such that the inner divider wall 435 of the secondary canister 433 is disposed adjacent to and in generally parallel relation to the inner divider wall 429 of the primary canister. The divider wall 435 of the secondary canister 433 may be provided with one or more communication ports 437 of any suitable size therethrough that are disposed adjacent to the communication port or ports 430 of the divider wall 429 of the primary canister 425. Alternatively, the divider wall 435 of the secondary canister 433 may be formed without a communication port or ports therethrough.

The divider wall 435 of the secondary canister 433 extends from one side of the central portion 420 of the pressure vessel 412 to the other side of the indented portion 420 to define the secondary gas generant portion 424 of the pressure vessel that includes the secondary exit orifice 440 and secondary rupture disk 442. The outer wall of the secondary canister 433 has an orifice 439 therethrough that is disposed adjacent to the secondary exit orifice 440.

An igniter body 450 formed of any suitable material and supporting a secondary ignition device 452 of any suitable construction is secured to the second or opposite end of the pressure vessel 412 in any suitable manner, such as by crimping. Within the secondary gas generant canister, there is mounted secondary gas generating energetics 454 of any suitable type that may be in the form of pellets or a solid grain, and may be the same as or different in type and amount from the primary energetics 446 in the primary canister 425.

The primary gas generant portion 422 and secondary gas generant portion 424 of the pressure vessel 412 are filled with a suitable gas, e.g., air, nitrogen or an inert gas such as argon or helium, or a mixture thereof, that is under a suitable predetermined pressure.

The operation of the inflator 410 shown in FIG. 5 is similar to the operation of the inflator 10 hereinbefore described. In the inflator 410, the divider walls 429 and 435 of the primary and secondary canisters 425 and 433, respectively, serve to separate the primary and secondary gas generant portions 422 and 424 of the pressure vessel 412 and thus a separate divider like the divider 26 of the inflator 10 shown in FIG. 1 is not required.

Within the scope of the present invention, a gas generant canister like the primary and secondary canisters 425 and 433, respectively, could be provided in only one of the primary or secondary gas generant portions 422 and 424, respectively. The other gas generant portion could include energetics of any suitable type mounted therein in any suitable manner, such as that shown in FIG. 1. In this alternate construction, the divider wall of the one gas generant canister would serve to separate the primary and secondary gas generant portions of the pressure vessel.

Figure 6:
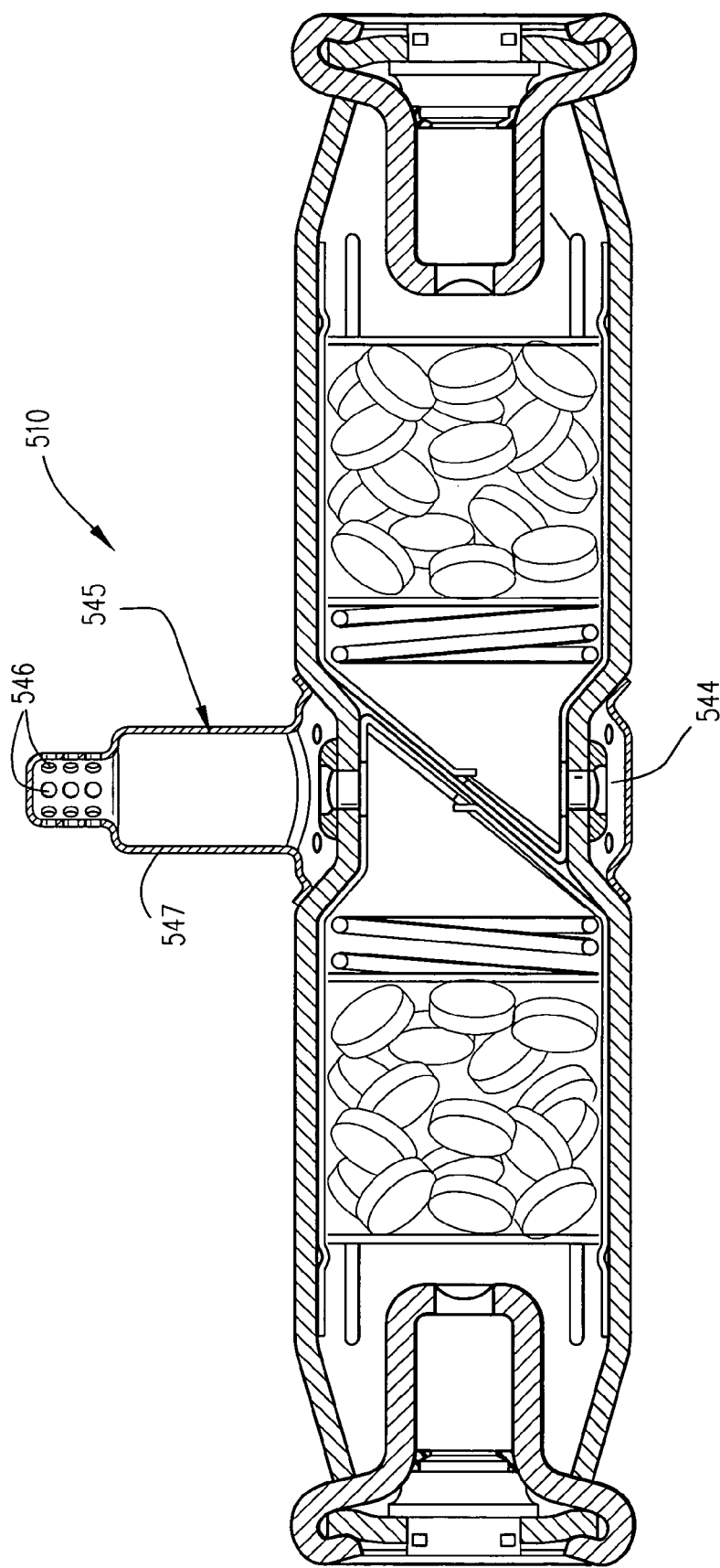
FIG. 6 is a side elevational view in section of a modified embodiment of the multi-level inflator shown in FIG. 5.

FIG. 6 illustrates a multi-level output inflator 510 that is substantially the same in construction and operation to the inflator 410 shown in FIG. 5, with the exception that the diffuser 544 is provided with a standpipe 545 for interface with the air bag module (not shown). The standpipe 545 has orifices 546 in its side wall 547 and is the same in construction and operation as the standpipe 245 hereinbefore described with respect to the embodiment shown in FIG. 3.

Figure 7:
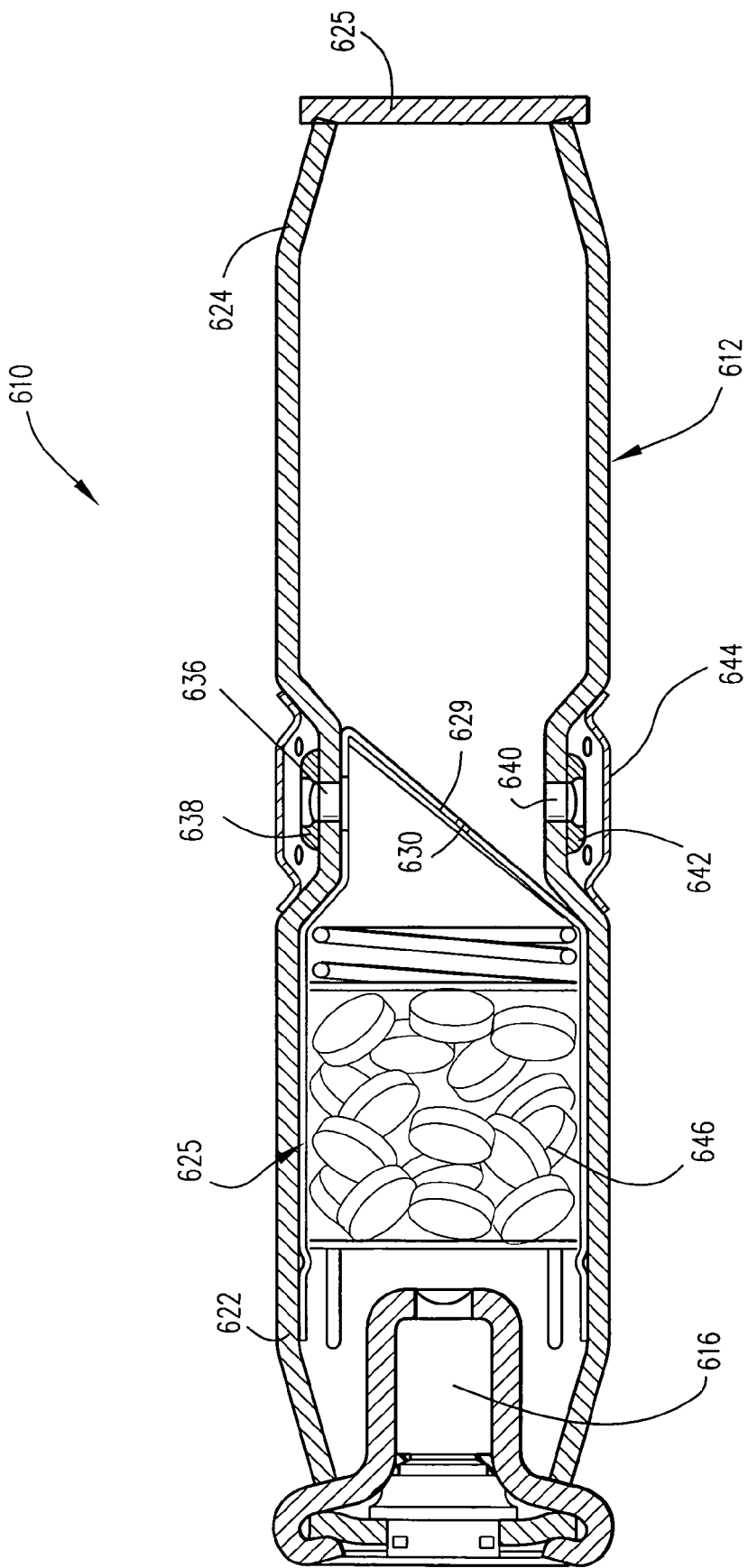
FIG. 7 is a side elevational view in section of a fourth embodiment of the multi-level output inflator of the present invention constructed for single level operation.

FIG. 7 is directed to a fourth embodiment of the inflator of the present invention which illustrates the simple manner in which the multi-level inflator of FIG. 5 can be converted into a single level inflator 610 wherein there are no energetics in the secondary portion 624 of the pressure vessel 612. The end of the secondary portion 624 is closed by a suitable closure member 625 of any suitable construction that is secured thereto in any suitable manner, such as by crimping or welding. The primary gas generant portion 622 of the pressure vessel 612 includes a primary ignition device 616, a primary gas generant canister 625, primary energetics 646, a primary exit orifice 636, a primary rupture disk 638 and a diffuser 644 which are constructed and operate in substantially the same manner as those shown in FIG. 5. A secondary exit orifice 640 and rupture disk 642 may be provided in the secondary portion 624 when one or more communication ports 630 are provided in the divider wall 629 of the primary canister 625.

Figure 8:
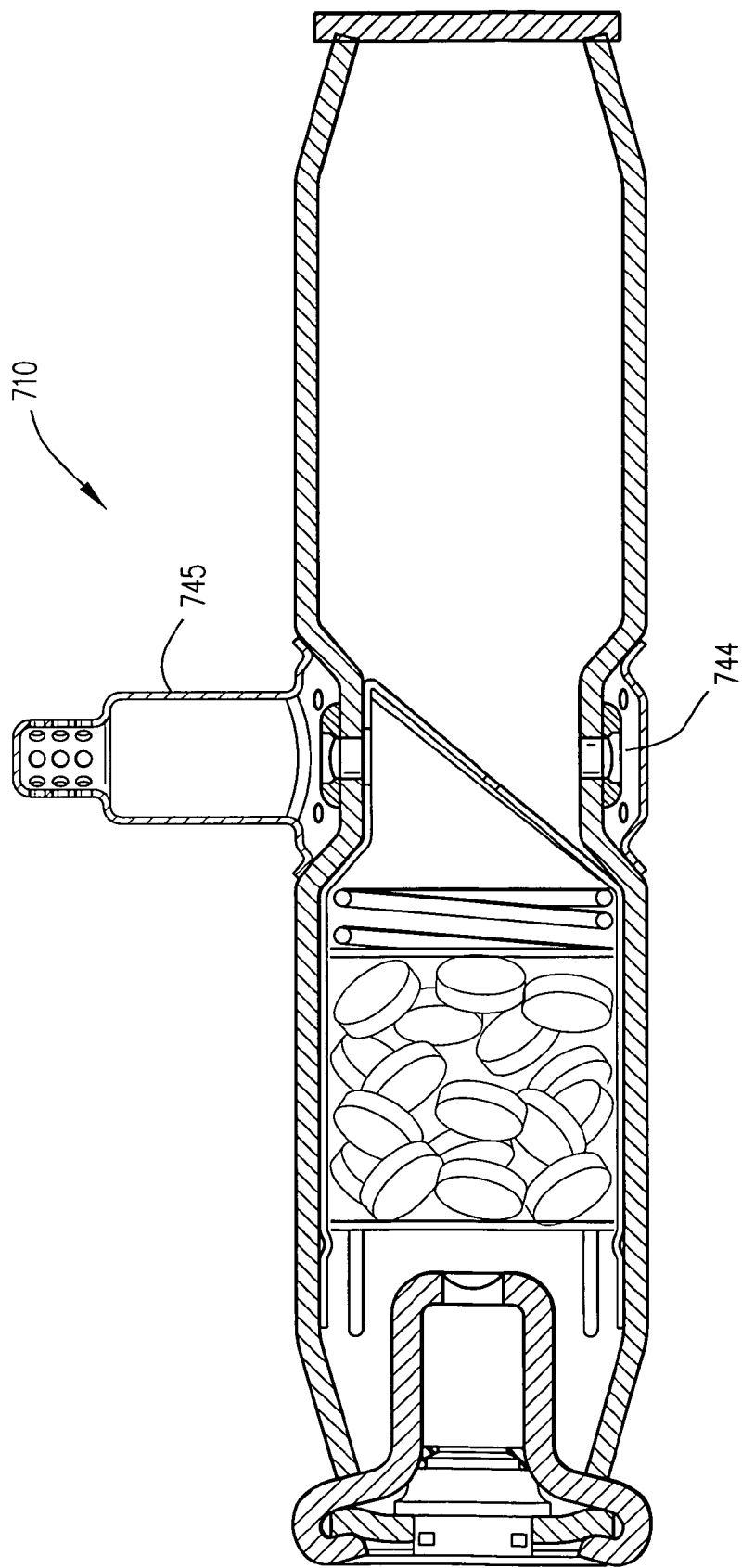
FIG. 8 is a side elevational view in section of a modified embodiment of the inflator shown in FIG. 7.

FIG. 8 illustrates a single level inflator 710 that is substantially the same in construction and operation to the inflator 610 shown in FIG. 7, with the exception that the diffuser 744 is provided with a standpipe 745 for interface with the air bag module (not shown). The standpipe 745 is the same in construction and operation to the standpipe 245 hereinbefore described with respect to the embodiment shown in FIG. 3.

FIGS. 10 and 11 illustrate a further embodiment of the present invention in which a release device 800 is movably mounted on the diffuser 844 of the inflator 810 adjacent to the secondary exit orifice 840 and secondary rupture disk 842. The release device 800 is operatively connected to a tether 802 that is in turn connected to the air bag (not shown) to limit the expansion thereof.

As shown in FIG. 10, the release device 800 comprises a cup-shaped portion 804 that surrounds the secondary exit orifice 840 and secondary rupture disk 842. An arm 806 is connected to the cup-shaped portion 804 and is slidably mounted on the diffuser 844. The arm 806 is removably attached in any suitable manner to a release member 805 of any suitable construction that is removably connected to the tether 802 in any suitable manner.

In the position shown in FIG. 10, the release device 800 is connected to the tether 802 to limit the size of the air bag expansion in response to initiation of the primary energetics and in the absence of initiation of the secondary energetics in the secondary gas generant portion 824 of the inflator. Upon the ignition of the secondary energetics, the pressurized gas created in the secondary gas generant portion opens the secondary rupture disk 842 to allow flow through the secondary exit orifice 840 into the diffuser 844. This gas flow enters the cup-shaped portion 804 of the release device 800 to move it outwardly to the position shown in FIG. 11 wherein the arm 806 has separated from the release member 805 and the tether 802 is released to allow additional expansion of the air bag when the primary and secondary energetics have been ignited in the inflator.

Figure 12:
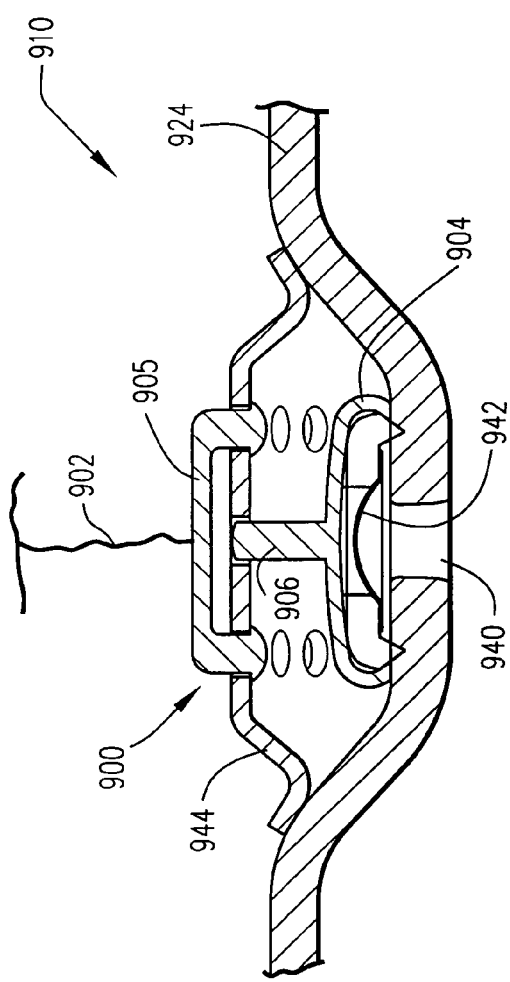
FIG. 12 is a side elevational view of a second embodiment of a release device movably mounted adjacent to the secondary exit orifice and rupture disk, and being connected to a tether for limiting the expansion of the air bag.
Figure 13:
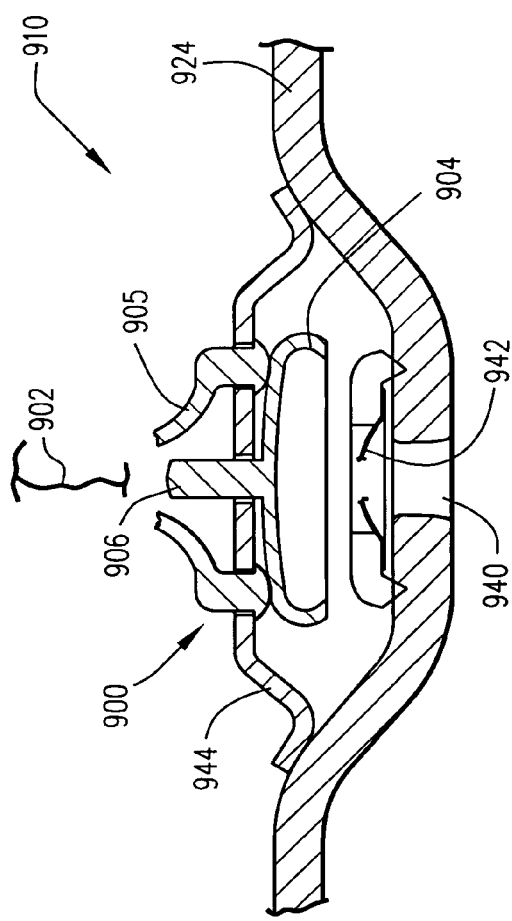
FIG. 13 is a side elevational view similar to FIG. 12 in which the release device has been moved outwardly by gas flow through the secondary exit orifice to release the tether and allow additional expansion of the air bag.

FIGS. 12 and 13 illustrate a second embodiment of a release device 900 that is removably mounted on the diffuser 944 of the inflator 910 adjacent to the secondary exit orifice 940 and secondary rupture disk 942. The release device 900 is operatively connected to a tether 902 that is in turn connected to the air bag (not shown) to limit the expansion thereof.

As shown in FIG. 12, the release device 900 comprises a cup-shaped portion 904 that surrounds the secondary exit orifice 940 and rupture disk 942. An arm 906 is connected to the cup-shaped portion 904 and is slidably mounted on the diffuser 944 for movement between a first position shown in FIG. 12 and a second position shown in FIG. 13 wherein it extends outwardly of the diffuser. A frangible release member 905 of any suitable construction is mounted on the diffuser 944 in alignment with the arm 906 when it moves outwardly of the diffuser 944. The release member 905 is removably connected to the tether 902 in any suitable manner.

In the position shown in FIG. 12, the release device 900 is connected to the tether 902 to limit the size of the air bag expansion in response to the initiation of the primary energetics and in the absence of initiation of the secondary energetics in the secondary gas generant portion 924 of the inflator 910. Upon the ignition of the secondary energetics, the pressurized gas created by the secondary portion 924 opens the secondary rupture disk 942 to allow gas flow through the secondary exit orifice 940 into the diffuser 944. This gas flow enters the cup-shaped portion 904 of the release device 900 to move it outwardly to the position shown in FIG. 13 wherein it is moved outwardly of the diffuser 944 into engagement with the release member 905 to break it and release the tether 902, thereby allowing additional expansion of the air bag when both the primary and secondary energetics have been ignited in the inflator.

Within the scope of the present invention, the tether release device may be of any suitable construction and operation. The significant feature is that it is mounted adjacent to the secondary exit orifice for operation in response to initiation of the secondary energetics to allow further expansion of the air bag when both the primary and secondary energetics are initiated.

Figure 14:
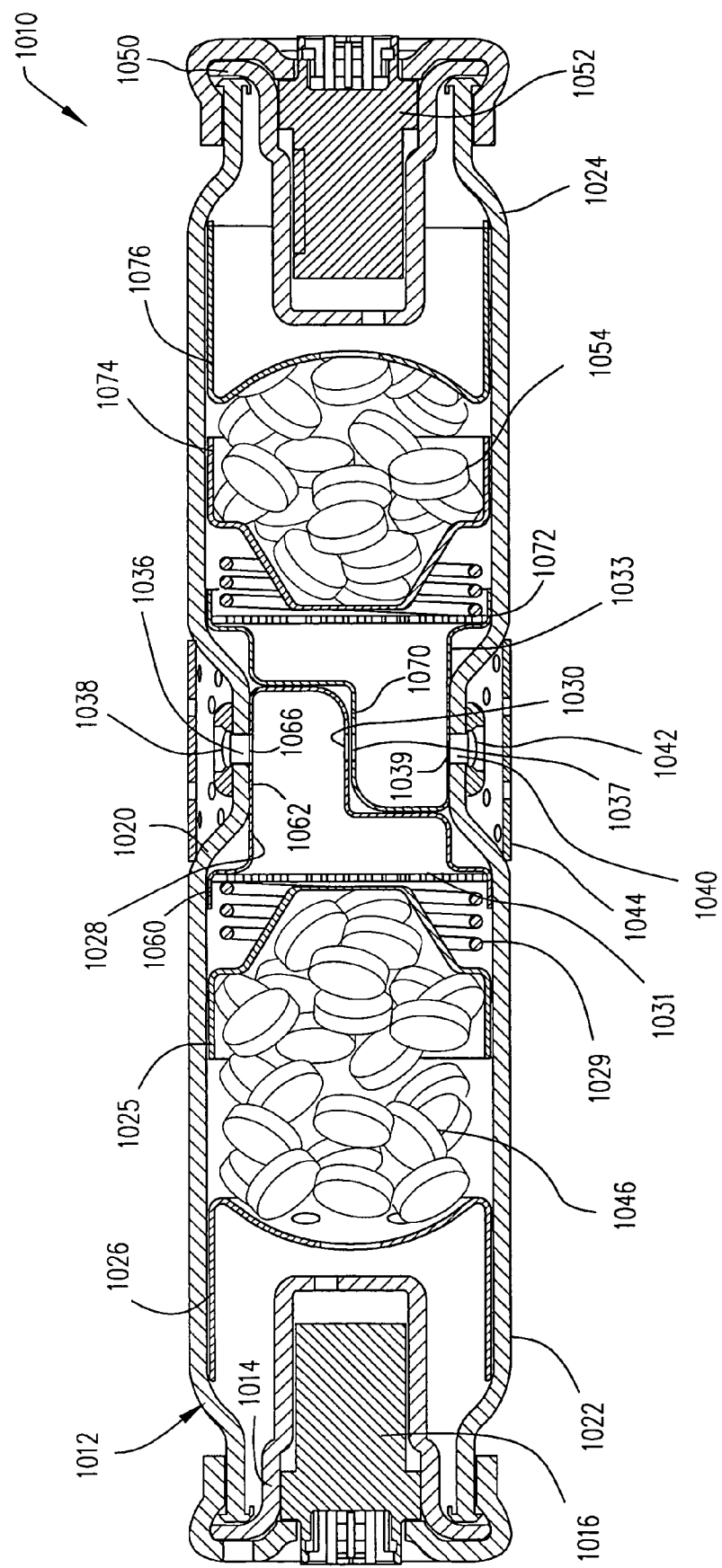
FIG. 14 is a side elevational view in section of a fifth embodiment of the multi-level output inflator of the present invention.

FIG. 14 illustrates a fifth embodiment of the multi-level output inflator 1010 of the present invention which comprises an elongated pressure vessel 1012 formed of any suitable material. An igniter body 1014 formed of any suitable material and supporting a primary ignition device 1016 of any suitable construction is secured to a first end of the pressure vessel 1012 in any suitable manner such as by crimping. The primary ignition device 1016 may be an initiator or a micro-gas generator.

The pressure vessel may be formed with an indented portion 1020 of any suitable configuration near the middle thereof. The middle or indented portion 1020 serves to define a primary gas generant portion 1022 of the pressure vessel between the indented portion 1020 and the primary ignition device 1016, and a secondary gas generant portion 1024 between the indented portion 1020 and the second or opposite end of the pressure vessel 1012.

A primary gas generant 1046 of any suitable type is disposed within the primary gas generant portion 1022 and is enclosed by inner and outer primary retention devices 1025 and 1026, respectively, of any suitable construction that are press-fitted within the pressure vessel or mounted therein in any other suitable manner.

A primary divider or cup 1028 is positioned in the pressure vessel 1012 inwardly of the inner primary retention device 1025 and is disposed within the middle or indented portion 1020. The primary divider 1028 may be slidably mounted or press-fitted within the pressure vessel until it engages the adjacent portion of the middle or indented portion 1020. An anti-rattle device 1029 and screen 1031 of any suitable construction may be disposed between the inner primary retention device 1025 and the primary divider 1028.

The primary divider 1028 is generally cup-shaped with an outer annular portion 1060 in engagement with the pressure vessel and an inner annular portion 1062 of smaller diameter extending into the indented portion 1020. The inner annular portion 1062 may have a diameter that is approximately one-half of the diameter of the indented portion 1020. An outer wall portion of the inner annular portion 1062 is disposed closely adjacent to the indented portion 1020 and is provided with an orifice 1066 in alignment with a primary exit orifice 1036 in the indented portion that is closed by a primary rupture disk 1038 of any suitable construction. An inner wall portion of the inner annular portion 1062 may have one or more communication ports 1030 of any suitable size extending therethrough for the purposes hereinbefore described.

The indented portion 1020 of the pressure vessel 1012 may also comprise a secondary exit orifice 1040 on the opposite side from the primary exit orifice 1036 that is closed by a secondary rupture disk 1042 of any suitable construction. A generally annular diffuser 1044 of any suitable construction may be provided to surround the indented portion 1020 and the primary and secondary exit orifices 1036 and 1040, respectively, and may be secured to the pressure vessel 1012 in any suitable manner. The diffuser 1044 is constructed for communication with an air bag module or other safety device (not shown), and may create a back pressure as hereinbefore described.

A secondary divider 1033 like the primary divider 1028 is positioned within the pressure vessel 1012 in inverted relation to the primary divider 1028 such that the inner annular portion 1070 thereof is disposed in the indented portion 1020 adjacent to the inner annular portion 1062 of the primary divider. The inner annular portion 1070 may have one or more communication ports 1037 in alignment with the communication port or ports 1030 in the inner annular portion 1062, and also has an orifice 1039 in alignment with the secondary exit orifice 1040 in the indented portion 1020. Like the primary divider, the secondary divider 1033 has an enlarged outer annular portion 1072 in engagement with the pressure vessel such that it is slidably mounted or press-fitted within the pressure vessel.

An igniter body 1050 formed of any suitable material and supporting a secondary ignition device 1052 of any suitable construction is secured to the second or opposite end of the pressure vessel 1012 in any suitable manner. Within the secondary gas generant portion 1024, there is disposed a secondary gas generant 1054 of any suitable type that is enclosed by inner and outer secondary retention devices 1074 and 1076, respectively. The secondary gas generant 1054 may be the same as or different in type and amount from the primary gas generant 1046.

The primary and secondary gas generant portions 1022 and 1024 of the pressure vessel 1012 are filled with a suitable gas, e.g., air, nitrogen or an inert gas such as argon or helium, or a mixture thereof, that is under a suitable predetermined pressure, depending on whether the inflator is a hybrid type or all pyrotechnic type.

The operation of the inflator 1010 shown in FIG. 14 is similar to the operation of the inflators 10 and 410 hereinbefore described. The construction of the inflator 1010 is advantageous in that the primary and secondary dividers 1028 and 1033 are simple in construction and can be easily press-fitted or positioned in the pressure vessel in a non-hermetic manner to separate the primary and secondary gas generant portions 1022 and 1024.

Figure 15:
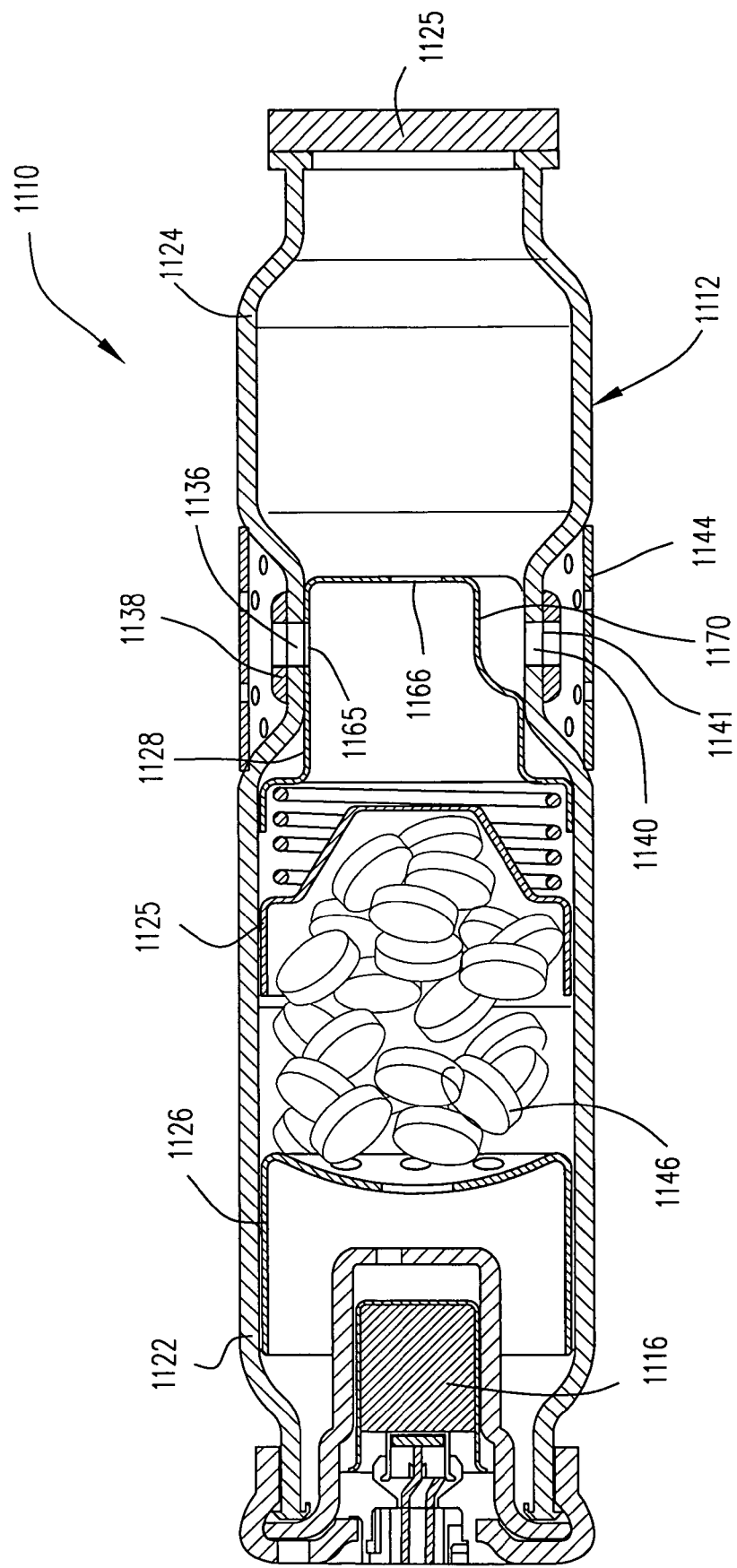
FIG. 15 is a side elevational view in section of a sixth embodiment of the multi-level output inflator of the present invention constructed for single level operation.

FIG. 15 shows a sixth embodiment of the inflator of the present invention which illustrates the simple manner in which the multi-level inflator 1010 of FIG. 14 can be converted into a single level inflator 1110 wherein there are no energetics or gas generant in the secondary portion 1124 of the pressure vessel 1112. The end of the secondary portion 1124 is closed by a closure member 1125 of any suitable construction that is secured thereto in any suitable manner. The primary gas generant portion 1122 includes a primary ignition device 1116, a primary gas generant 1146, primary retention devices 1125 and 1126, a primary divider 1128, a primary exit orifice 1136, a primary rupture disk 1138 and a diffuser 1144 which are constructed and operate in substantially the same manner as those shown in FIG. 14.

The primary divider 1128 has a first orifice 1165 in alignment with the primary exit orifice 1136, and differs from the primary divider 1028 of FIG. 14 in that it has an inner annular portion 1170 of larger diameter with a second orifice 1166 in the inner end thereof that is in communication with the secondary portion 1124 and the secondary exit orifice 1140 that is closed by a secondary rupture disk 1141.

It is noted that the inflator constructions disclosed herein may be used for all-pyrotechnic inflators as well as hybrid inflators.

From the foregoing description, it will be readily seen that the new and improved inflators of the present invention are compact, low in cost, simple in construction, simple and reliable in operation, easily constructed and easily convertible from a multi-level output to a single level output construction.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims. Specifically, although not the preferred embodiment, the pressure vessel could be constructed without the indented central portion.

What is claimed is:

1. A gas generator for an air bag or other safety device, comprising:
    an elongated pressure vessel having a primary gas generant portion with a first open end and a secondary portion with a second open end;
    said primary gas generating portion having a primary ignition device and primary gas generating energetics disposed therein, said primary ignition device being mounted on said pressure vessel at said first open end;
    a pressure vessel closure secured to said second end of said pressure vessel;
    said primary gas generant portion having a gas therein under a predetermined pressure;
    said pressure vessel having a midportion, a divider wall disposed within the midportion of said pressure vessel to separate said primary gas generant portion and said secondary portion; and
    said divider wall being separate from said pressure vessel and being in non-hermetic engagement therewith;
    said pressure vessel having a primary exit orifice in said midportion thereof that is in communication with said primary gas generant portion, a primary rupture disk disposed over said primary exit orifice;
    the midportion of said pressure vessel being indented to retain said divider wall in position between said primary gas generant portion and said secondary portion.

2. The gas generator of claim 1 wherein a diffuser surrounds said primary exit orifice and the midportion of said pressure vessel, said diffuser being in communication with the air bag and being mounted on said indented portion.

3. The gas generator of claim 1 wherein said divider wall is secured to the midportion of said pressure vessel.

4. The gas generator of claim 1 wherein said divider wall has at least one communication port therethrough.

5. The gas generator of claim 3 wherein said communication port is oriented to direct gas flow therethrough in a direction that is generally radial or perpendicular to the longitudinal axis of said pressure vessel.

6. The gas generator of claim 1 wherein said divider wall comprises a central longitudinally extending portion, a first transverse end portion disposed adjacent to the midportion of said pressure vessel on one side thereof near said primary gas generant portion, and a second transverse end portion disposed adjacent to the midportion of said pressure vessel on the other side thereof near said secondary portion.

7. The gas generator of claim 1 wherein a primary canister containing said primary energetics is positioned in said primary gas generant portion, and said divider wall is the inner end wall of said primary canister.

8. The gas generator of claim 7 wherein said primary canister has an orifice therethrough in alignment with said primary exit orifice.

9. The gas generator of claim 1 wherein said secondary portion is a gas generant portion, said pressure vessel closure comprises a secondary ignition device, secondary gas generating energetics are disposed in said secondary gas generant portion, said midportion of said pressure vessel has a secondary exit orifice in communication with said secondary gas generant portion, and a secondary rupture disk is disposed over said secondary exit orifice whereby said inflator is a multi-level output inflator.

10. The gas generator of claim 9 wherein a diffuser surrounds the midportion of said pressure vessel and said primary and secondary exit orifices, said diffuser being in communication with the air bag or other safety device and being mounted on said indented portion.

11. The gas generator of claim 10 wherein said diffuser is constructed to create a back pressure therein when one of the gas generant portions is activated to delay the functioning of the exit orifice in the other gas generant portion that is not activated at the same time as the one gas generant portion.

12. The gas generator of claim 1 wherein said secondary portion has said gas under a predetermined pressure therein.

13. The gas generator of claim 1 wherein said gas is air, an inert gas or nitrogen.

14. The gas generator of claim 4 wherein said midportion of said pressure vessel has a secondary exit orifice in communication with said secondary portion, and a secondary rupture disk is disposed over said secondary exit orifice.

15. A multi-level gas generator for an air bag or other safety device, comprising:
- an elongated pressure vessel having a primary gas generant portion with a first open end and a secondary gas generant portion with a second open end;
- said primary gas generant portion having a primary ignition device and primary gas generating energetics disposed therein, said primary ignition device being mounted on said pressure vessel at said first open end;
- said secondary gas generant portion having a secondary ignition device and secondary gas generating energetics disposed therein, said secondary ignition device being mounted on said pressure vessel at said second open end;
- said primary gas generant portion and said secondary gas generant portion having a gas therein under a predetermined pressure;
- said pressure vessel having a midportion, a divider wall disposed within said midportion to separate said primary and secondary gas generant portions; said divider wall being separate from said pressure vessel and being in non-hermetic engagement therewith; and
- said pressure vessel having a primary exit orifice in said midportion that is in communication with said primary gas generant portion, a primary rupture disk disposed over said primary exit orifice, a secondary exit orifice in said midportion that is in communication with said secondary gas generant portion, and a secondary rupture disk disposed over said secondary exit orifice;
- the midportion of said pressure vessel being indented.

16. The gas generator of claim 15 wherein a diffuser is mounted on and surrounds said midportion and said primary and secondary exit orifices, said diffuser being in communication with the air bag or other safety device and being mounted on said indented portion.

17. The gas generator of claim 16 wherein said diffuser is constructed to create a back pressure therein when one of said gas generant portions is activated to delay the functioning of the exit orifice in the other gas generant portion that is not activated at the same time as the one gas generant portion.

18. The multi-level gas generator of claim 15 wherein said divider wall is secured to the midportion of said pressure vessel.

19. The multi-level gas generator of claim 15 wherein said divider wall has at least one communication port therethrough.

20. The multi-level gas generator of claim 19 wherein said communication port is oriented to direct gas flow therethrough in a direction that is generally radial or perpendicular to the longitudinal axis of said pressure vessel.

21. The multi-level gas generator of claim 15 wherein said divider wall comprises a central longitudinally extending portion, a first transverse end portion disposed adjacent to the midportion of said pressure vessel on one side thereof near said primary gas generant portion, and a second transverse end portion disposed adjacent to the midportion of said pressure vessel on the other side thereof near said secondary gas generant portion.

22. The multi-level gas generator of claim 15 wherein a primary canister containing said primary energetics is positioned in said primary gas generant portion, and said divider wall is the inner end wall of said primary canister.

23. The multi-level gas generator of claim 22 wherein said primary canister has an orifice therethrough in alignment with said primary exit orifice.

24. The multi-level gas generator of claim 23 wherein a secondary canister containing said secondary energetics is positioned in said secondary gas generant portion, said secondary canister having an inner secondary divider end wall positioned adjacent to and substantially parallel to said primary divider wall.

25. The multi-level gas generator of claim 24 wherein said secondary canister has an orifice therethrough in alignment with said secondary exit orifice.

26. The multi-level gas generator of claim 25 wherein said primary divider wall and said secondary divider wall have one or more aligned communication ports therethrough.

27. The multi-level gas generator of claim 15 wherein said divider wall comprises a central longitudinally extending portion, a first transverse end portion disposed adjacent to the indented midportion of said pressure vessel on one side thereof near said primary gas generant portion, and a second transverse end portion disposed adjacent to the indented midportion of said pressure vessel on the other side thereof near said secondary gas generant portion.

28. A multi-level gas generator for an air bag comprising:
- an elongated pressure vessel having a primary gas generant portion and a secondary gas generant portion;
- said primary gas generant portion and said secondary gas generant portion having a gas therein under a predetermined pressure;
- said primary vessel having a midportion, a divider wall disposed within said midportion to separate said primary and secondary gas generant portions; and
- a tether operatively connected to the air bag to limit the amount of inflation thereof in response to gas generated by said primary gas generant portion, a release device operatively connected to said tether and to said secondary gas generant portion, and being operable to release said tether in response to gas generated by said secondary gas generant portion to allow further inflation of the air bag by said secondary gas generation.

29. The multi-level gas generator of claim 28 wherein said pressure vessel has a secondary exit orifice in said midportion that is in communication with said secondary gas generant portion, and a secondary rupture disk is disposed over said secondary exit orifice.

30. The multi-level gas generator of claim 29 wherein said release device is movably mounted on said pressure vessel adjacent to said secondary exit orifice and rupture disk, and is movable outwardly from said pressure vessel in response to gas flow through said secondary exit orifice to release said tether.

31. The multi-level gas generator of claim 30 wherein a diffuser is mounted on and surrounds said midportion and is in communication with the air bag, said release device being movably mounted on said diffuser and comprising a cup-shaped portion for receiving gas flow through said secondary exit orifice.

32. The multi-level gas generator of claim 31 wherein said release device comprises a frangible release member that is releasably connected to said tether, said release member being broken by outward movement of said release device in response to secondary gas generation to release said tether.

33. The multi-level gas generator of claim 32 wherein said release device comprises an arm that is movably mounted on said diffuser, said arm being connected to said cup-shaped portion.

34. A gas generator for an air bag or other safety device, comprising:
- an elongated pressure vessel having a primary gas generant portion with a first open end and a secondary portion with a second open end;
- said primary gas generating portion having a primary ignition device and primary gas generating energetics disposed therein, said primary ignition device being mounted on said pressure vessel at said first open end;

a pressure vessel closure secured to said second end of said pressure vessel;

said primary gas generant portion having a gas therein under a predetermined pressure;

said pressure vessel having a midportion, a primary divider disposed within said midportion to separate said primary gas generant portion and said secondary portion, said primary divider being slidably mounted within said midportion;

said pressure vessel having a primary exit orifice in said midportion that is in communication with said primary gas generant portion, and a primary rupture disk disposed over said primary exit orifice.

35. The gas generator of claim 34 wherein said primary divider is press-fitted within said midportion.

36. The gas generator of claim 34 wherein said midportion is indented.

37. The gas generator of claim 36 wherein said primary divider is cup-shaped and has an outer annular portion in engagement with said midportion and an inner annular portion of smaller diameter than said outer annular portion, said inner annular portion extending into said midportion.

38. The gas generator of claim 37 wherein said inner annular portion has a first orifice in alignment with said primary exit orifice.

39. The gas generator of claim 38 wherein said inner annular portion has a second orifice in communication with said secondary portion.

40. The gas generator of claim 39 wherein said midportion of said pressure vessel has a secondary exit orifice in communication with said secondary portion, and a secondary rupture disk is disposed over said secondary exit orifice.

41. The gas generator of claim 34 wherein said primary divider is the inner end wall of a primary canister containing said primary energetics.

42. The gas generator of claim 37 wherein said outer annular portion of said primary divider is of a size that is about the same as the interior of said pressure vessel adjacent said midportion, and said inner annular portion is of a size that is about one-half of the interior of said midportion.

43. The gas generator of claim 34 wherein said primary divider is in non-hermetic relation with said midportion.

44. The gas generator of claim 39 wherein a diffuser is mounted on and surrounds the midportion.

45. The gas generator of claim 34 wherein said secondary portion is a gas generant portion, said pressure vessel closure comprises a secondary ignition device, secondary gas generating energetics are disposed in said secondary gas generant portion, said midportion has a secondary exit orifice in communication with said secondary gas generant portion, a secondary rupture disk is disposed over said secondary exit orifice, and a secondary divider is disposed within said midportion adjacent to said primary divider, said secondary divider being slidably mounted within said midportion.

46. The gas generator of claim 45 wherein said primary divider and said secondary divider have communication ports therethrough in alignment with each other.

47. The gas generator of claim 46 wherein said communication ports are oriented to direct gas flow therethrough in a direction that is generally radial or perpendicular to the longitudinal axis of said pressure vessel.

48. The gas generator of claim 45 wherein said midportion is indented;

said primary divider is cup-shaped and has an outer annular portion in engagement with said midportion and an inner annular portion of smaller diameter than said outer annular portion; said inner annular portion extending into said midportion; and said secondary divider is cup-shaped and has an outer annular portion in engagement with the opposite side of said midportion and an inner annular portion of smaller diameter than said secondary divider outer annular portion, said secondary divider inner annular portion extending into said midportion in adjacent relation to said primary divider inner annular portion.

49. The gas generator of claim 48 wherein said primary divider inner annular portion has an orifice in alignment with said primary exit orifice, and said secondary divider inner annular portion has an orifice in alignment with said secondary exit orifice.

50. The gas generator of claim 45 wherein said primary divider and said secondary divider are in nonhermetic relation with said midportion.

51. The gas generator of claim 45 wherein said secondary divider is press-fitted within said midportion.

52. The gas generator of claim 48 wherein said primary divider outer annular portion is of a size that is about the same as the interior of said pressure vessel adjacent one end of said midportion and said primary divider inner annular portion is of a size that is about one half of the interior of said midportion; and said secondary divider outer annular portion is of a size that is about the same as the interior of said pressure vessel adjacent the other end of said midportion, and said secondary divider inner annular portion is of a size that is about one half of the interior of said midportion.

53. The gas generator of claim 45 wherein a diffuser is mounted on and surrounds said midportion and said primary and secondary exit orifices.

54. The gas generator of claim 53 wherein said diffuser is constructed to create a back pressure therein when one of said gas generant portions is activated to delay the functioning of the exit orifice in the other gas generant portion that is not activated at the same time as the one gas generant portion.

* * * * *